(12) United States Patent
Marthala et al.

(10) Patent No.: US 10,768,907 B2
(45) Date of Patent: Sep. 8, 2020

(54) SYSTEM FOR TRANSFORMATION PREDICTION WITH CODE CHANGE ANALYZER AND IMPLEMENTER

(71) Applicant: BANK OF AMERICA CORPORATION, Charlotte, NC (US)

(72) Inventors: Haribabu Reddy Marthala, Hyderabad (IN); Bhagat Kumar Allugubelly, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/262,635

(22) Filed: Jan. 30, 2019

(65) Prior Publication Data

US 2020/0241849 A1    Jul. 30, 2020

(51) Int. Cl.
*G06F 8/34* (2018.01)
*G06F 8/38* (2018.01)
*G06F 8/41* (2018.01)
*G06F 16/25* (2019.01)

(52) U.S. Cl.
CPC .................. *G06F 8/34* (2013.01); *G06F 8/38* (2013.01); *G06F 8/433* (2013.01); *G06F 16/258* (2019.01)

(58) Field of Classification Search
None
See application file for complete search history.

(56) References Cited

U.S. PATENT DOCUMENTS

| | | | |
|---|---|---|---|
| 5,212,794 A | 5/1993 | Pettis et al. | |
| 5,274,811 A | 12/1993 | Borg et al. | |
| 5,313,608 A | 5/1994 | Takai | |
| 5,493,664 A | 2/1996 | Doi | |
| 5,528,753 A | 6/1996 | Fortin | |
| 5,530,804 A | 6/1996 | Edgington et al. | |
| 5,560,036 A | 9/1996 | Yoshida | |
| 5,561,761 A | 10/1996 | Hicok et al. | |

(Continued)

OTHER PUBLICATIONS

Petri "Acronis, Protecting & Securing Your Critical Data with Acronis Backup", Jul. 2018, pp. 1-7, [online] [retrieved on Dec. 20, 2019]. Retrieved from <https://d1.acronis.com/u/rc/VVP Acronis Backup MostSecureBackup EN-US 180801.pdf>. (Year: 2018).

*Primary Examiner* — S. Sough
*Assistant Examiner* — Cheneca Smith
(74) *Attorney, Agent, or Firm* — Michael A. Springs; Moore & Van Allen PLLC; Anup Shrinivasan Iyer

(57) ABSTRACT

Systems, computer program products, and methods are described herein for data transformation prediction and code change analysis. The present invention is configured to electronically receive one or more data transformation protocols; electronically extract data from a first source system based on at least receiving the one or more data transformation protocols; initiate an impact analysis associated with transforming the data extracted from the first source system using the one or more data transformation protocols, wherein initiating further comprises determining one or more impacts of the data transformation on one or more other source systems; and initiate a presentation of a user interface for display on the user device, wherein the user interface comprises a graphical representation of the one or more impacts of the data transformation of the data extracted from the first source system on the one or more other source systems.

20 Claims, 8 Drawing Sheets

(56) References Cited

U.S. PATENT DOCUMENTS

| | | |
|---|---|---|
| 5,581,695 A | 12/1996 | Knoke et al. |
| 5,664,191 A | 9/1997 | Davidson et al. |
| 5,689,712 A | 11/1997 | Heisch |
| 5,737,516 A | 4/1998 | Circello et al. |
| 5,748,878 A | 5/1998 | Rees et al. |
| 5,764,885 A | 6/1998 | Sites et al. |
| 5,900,014 A | 5/1999 | Bennett |
| 5,944,841 A | 8/1999 | Christie |
| 5,953,530 A | 9/1999 | Rishi et al. |
| 5,996,092 A | 11/1999 | Augsburg et al. |
| 6,026,236 A | 2/2000 | Fortin et al. |
| 6,223,338 B1 | 4/2001 | Smolders |
| 6,233,678 B1 | 5/2001 | Bala |
| 6,351,844 B1 | 2/2002 | Bala |
| 7,299,216 B1 | 11/2007 | Liang et al. |
| 7,941,397 B2 | 5/2011 | Wilms et al. |
| 8,019,795 B2 | 9/2011 | Anderson et al. |
| 8,239,498 B2 | 8/2012 | Kilpatrick et al. |
| 8,386,419 B2 | 2/2013 | Yalamanchilli |
| 8,423,502 B1 | 4/2013 | Degany et al. |
| 8,768,880 B2 | 7/2014 | Erla et al. |
| 9,268,828 B2 | 2/2016 | Rausch et al. |
| 9,348,879 B2 | 5/2016 | Mohammad et al. |
| 10,042,903 B2 | 8/2018 | Dhayapule et al. |
| 10,121,019 B2 | 11/2018 | Struttmann |
| 2003/0056195 A1 | 3/2003 | Hunt |
| 2006/0123389 A1 | 6/2006 | Kolawa et al. |
| 2007/0239769 A1 | 10/2007 | Fazal et al. |
| 2008/0140537 A1 | 6/2008 | Powell |
| 2008/0195430 A1 | 8/2008 | Rustagi |
| 2008/0307262 A1 | 12/2008 | Carlin, III |
| 2008/0307430 A1 | 12/2008 | Friedlander et al. |
| 2010/0325569 A1 | 12/2010 | King et al. |
| 2011/0047525 A1 | 2/2011 | Castellanos et al. |
| 2011/0265061 A1 | 10/2011 | Moore |
| 2011/0296391 A1 | 12/2011 | Gass et al. |
| 2012/0017280 A1 | 1/2012 | Wiegenstein et al. |
| 2012/0102007 A1 | 4/2012 | Ramasubramanian et al. |
| 2012/0246170 A1 | 9/2012 | Iantorno |
| 2012/0271865 A1 | 10/2012 | Jin et al. |
| 2012/0324419 A1 | 12/2012 | Roberts et al. |
| 2013/0151491 A1 | 6/2013 | Gislason |
| 2013/0152047 A1 | 6/2013 | Moorthi et al. |
| 2013/0173529 A1 | 7/2013 | Erla et al. |
| 2013/0246376 A1 | 9/2013 | Padmanabhan et al. |
| 2014/0040182 A1* | 2/2014 | Gilder ............... G06F 17/2264 707/602 |
| 2014/0059561 A1 | 2/2014 | Grasselt et al. |
| 2016/0125057 A1* | 5/2016 | Gould ............... G06F 16/2465 707/756 |
| 2018/0189055 A1* | 7/2018 | Dasgupta ........... G06F 11/3608 |
| 2018/0253291 A1* | 9/2018 | Jeon ..................... G06F 8/423 |
| 2019/0324958 A1 | 10/2019 | Ow et al. |
| 2019/0340379 A1 | 11/2019 | Beecham |
| 2020/0159696 A1 | 5/2020 | Adluri et al. |

* cited by examiner

SYSTEM FOR TRANSFORMATION PREDICTION WITH CODE CHANGE ANALYZER AND IMPLEMENTER

FIELD OF THE INVENTION

The present invention embraces a system for predicting data transformation impacts on one or more source systems, analyzing changes, and implementing code changes.

BACKGROUND

The process of extracting data from source systems and bringing it into the data warehouse is commonly called ETL, which stands for extraction, transformation, and loading. Data from one or more sources is extracted and then copied to the data warehouse. When dealing with large volumes of data and multiple source systems, the data is consolidated. ETL is used to migrate data from one database to another, and is often the specific process required to load data to and from data marts and data warehouses, but is a process that is also used to convert (transform) databases from one format or type to another. However, data transformation intended to impact a specific target or a specific source can sometimes impact other neighboring source systems.

There is a need for a system capable of predicting data transformation impacts and analyzing code changes.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for data transformation prediction and code change analysis is presented. The system comprising: at least one non-transitory storage device; and at least one processing device coupled to the at least one non-transitory storage device, wherein the at least one processing device is configured to: electronically receive, from a user device, a data transformation request, wherein the data transformation request comprises one or more data transformation protocols; electronically extract data from a first source system based on at least receiving the one or more data transformation protocols; initiate an impact analysis associated with transforming the data extracted from the first source system using the one or more data transformation protocols, wherein initiating further comprises determining one or more impacts of the data transformation of the data extracted from the first source system on one or more other source systems; and initiate a presentation of a user interface for display on the user device, wherein the user interface comprises a graphical representation of the one or more impacts of the data transformation of the data extracted from the first source system on the one or more other source systems.

In some embodiments, the impact analysis further comprises initiating one or more machine learning algorithms on one or more historical data transformation requests, one or historical data transformation protocols, one or more source systems associated with the one or more historical data transformation requests, and an impact of the one or more historical transformation of historical data extracted from the one or more source systems associated with the one or more historical data transformation requests.

In some embodiments, the at least one processing device is further configured to: receive the one or more data transformation protocols and information associated with the first source system; and predict, using the one or more machine learning algorithms, the one or more impacts of the data transformation of the data extracted from the first source system on the one or more other source systems.

In some embodiments, the at least one processing device is further configured to generate a map of the one or more impacts of the data transformation of the data extracted from the first source system on the one or more other source systems.

In some embodiments, the at least one processing device is further configured to: determine one or more target systems associated with the data transformation of the data extracted from the first source system; determine one or more target applications associated with each of the one or more target systems; and initiate the data transformation of the data extracted from the first source system, wherein initiating further comprises initiating one or more changes to the one or more target systems using the one or more target applications based on at least the one or more data transformation protocols.

In some embodiments, initiating the one or more changes to the one or more target systems further comprises: extracting a source code associated with each of the one or more target applications; transforming the source code associated with each of the one or more target applications; and implementing the one or more changes to the one or more target systems based on at least transforming the source code associated with each of the one or more target applications.

In some embodiments, the at least one processing device is further configured to: initiate, via the user interface, a notification to the user indicating the one or more impacts of the data transformation of the data extracted from the first source system on the one or more other source systems, wherein the notification further comprises a confirmation request to implement the data transformation of the data extracted from the first source system; electronically receive, via the user interface, a confirmation from the user to implement the data transformation of the data extracted from the first source system; and initiate the data transformation of the data extracted from the first source system based on at least receiving the confirmation from the user to implement the data transformation of the data extracted from the first source system.

In another aspect, a computer implemented method for data transformation prediction and code change analysis is presented. The method comprising: electronically receiving, from a user device, one or more data transformation protocols; electronically extracting data from a first source system based on at least receiving the one or more data transformation protocols; initiating an impact analysis associated with transforming the data extracted from the first source system using the one or more data transformation protocols, wherein initiating further comprises determining one or more impacts of the data transformation of the data extracted from the first source system on one or more other source systems; and initiating a presentation of a user interface for display on the user device, wherein the user interface comprises a graphical representation of the one or more impacts of the data transformation of the data extracted from the first source system on the one or more other source systems.

In yet another aspect, a computer program product for data transformation prediction and code change analysis is presented. The computer program product comprising a non-transitory computer-readable medium comprising code causing an apparatus to: electronically receive, from a user device, one or more data transformation protocols; electronically extract data from a first source system based on at least receiving the one or more data transformation protocols; initiate an impact analysis associated with transforming the data extracted from the first source system using the one or more data transformation protocols, wherein initiating further comprises determining one or more impacts of the data transformation of the data extracted from the first source system on one or more other source systems; and initiate a presentation of a user interface for display on the user device, wherein the user interface comprises a graphical representation of the one or more impacts of the data transformation of the data extracted from the first source system on the one or more other source systems.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
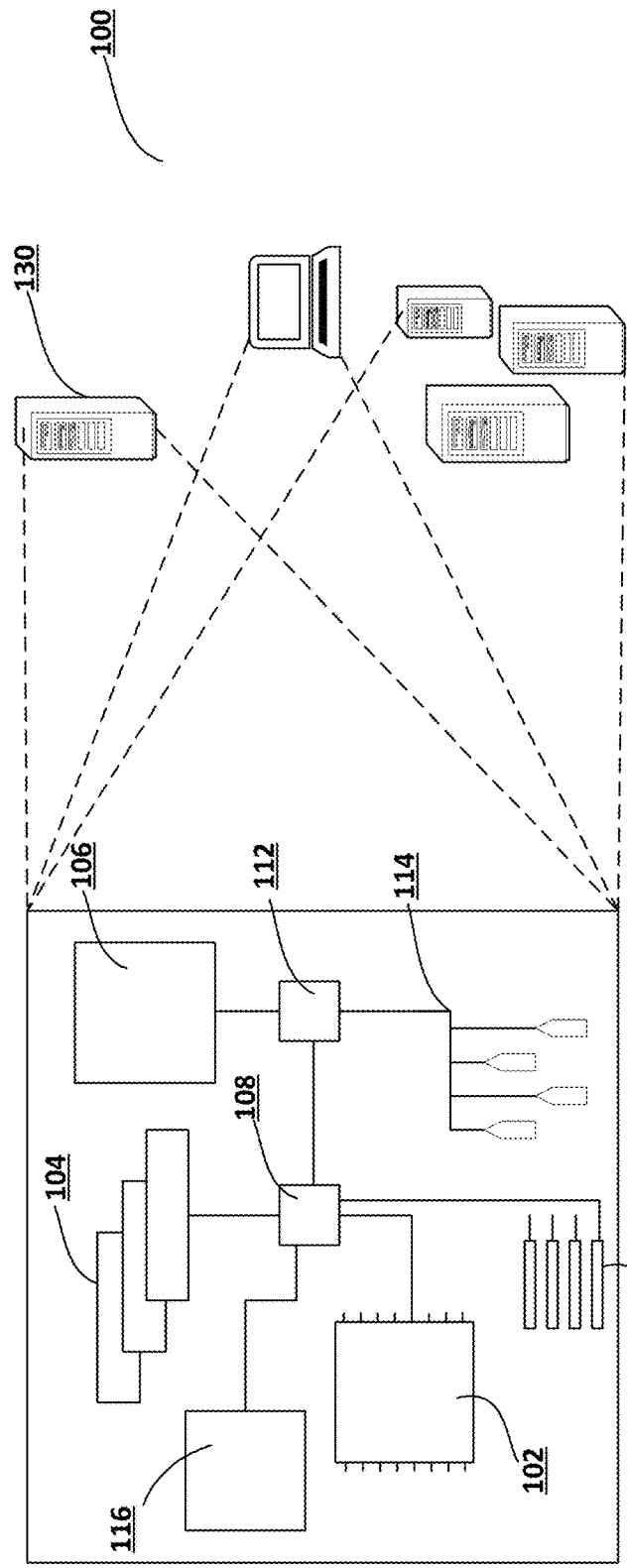
Figure 1:
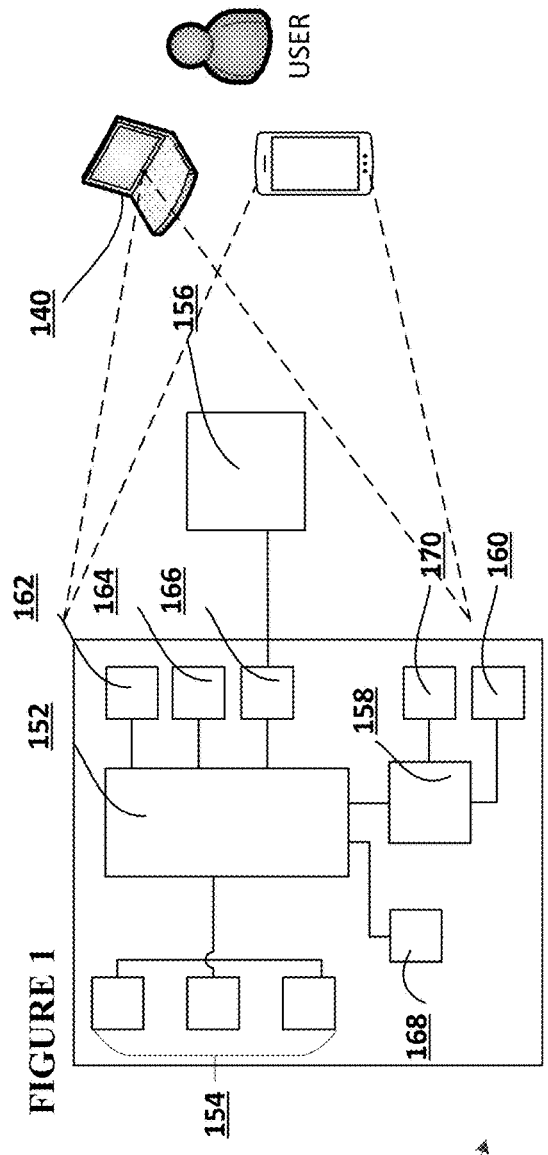
Figure 2:
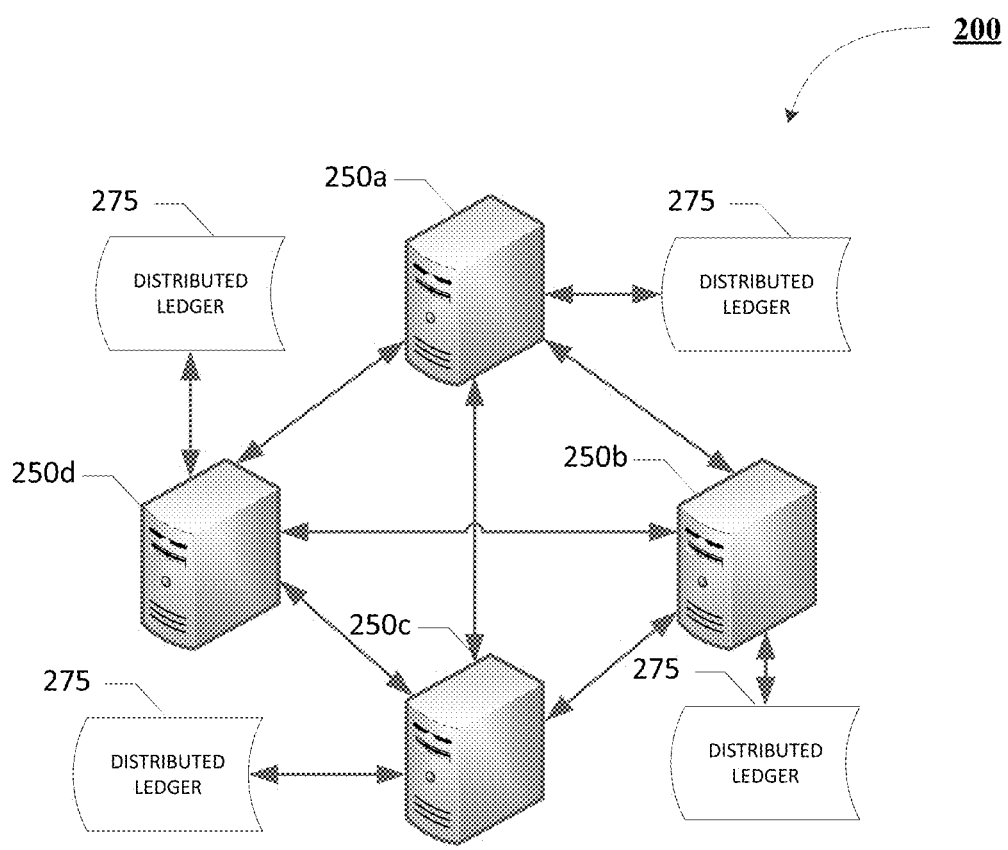
Figure 3:
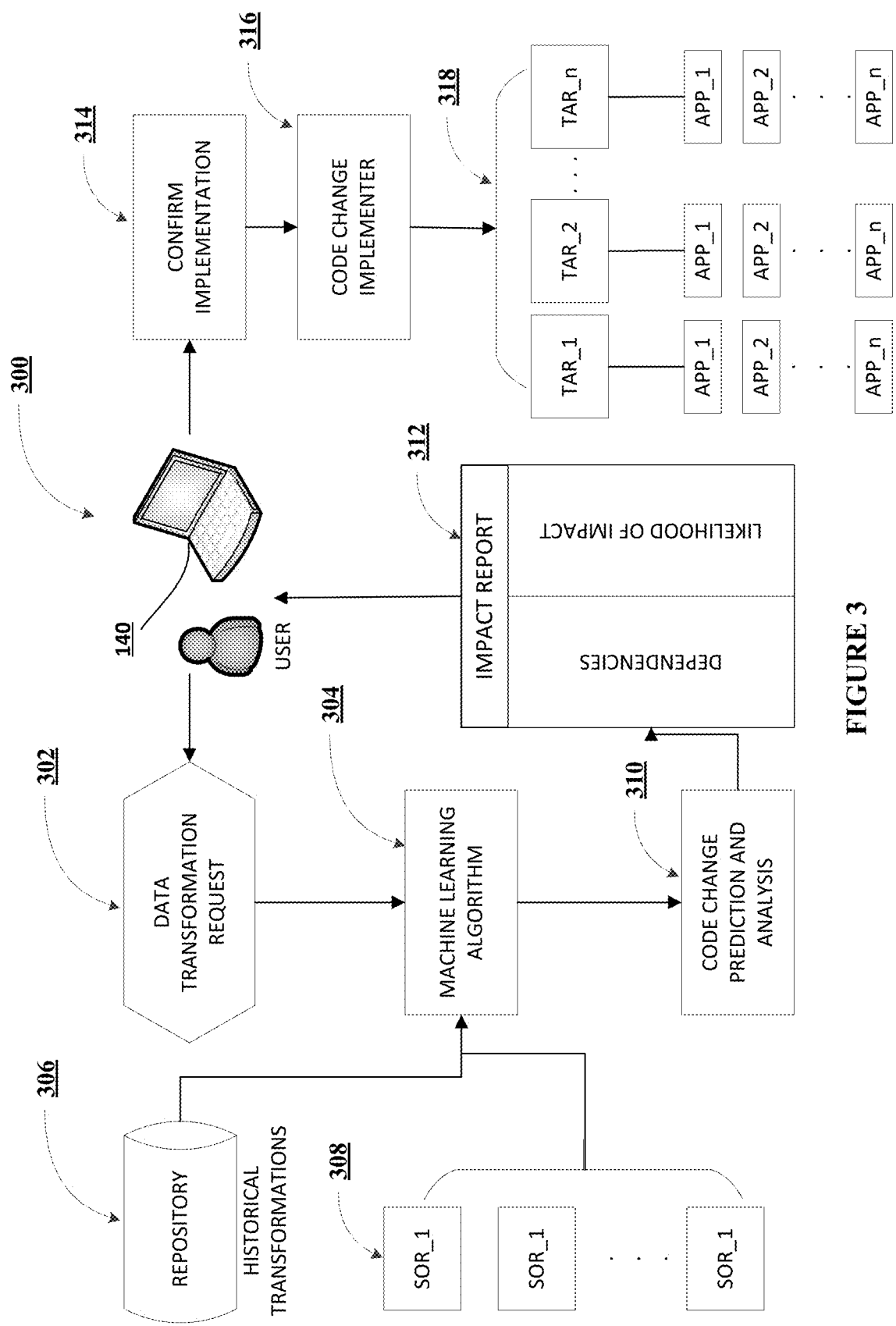
Figure 4:
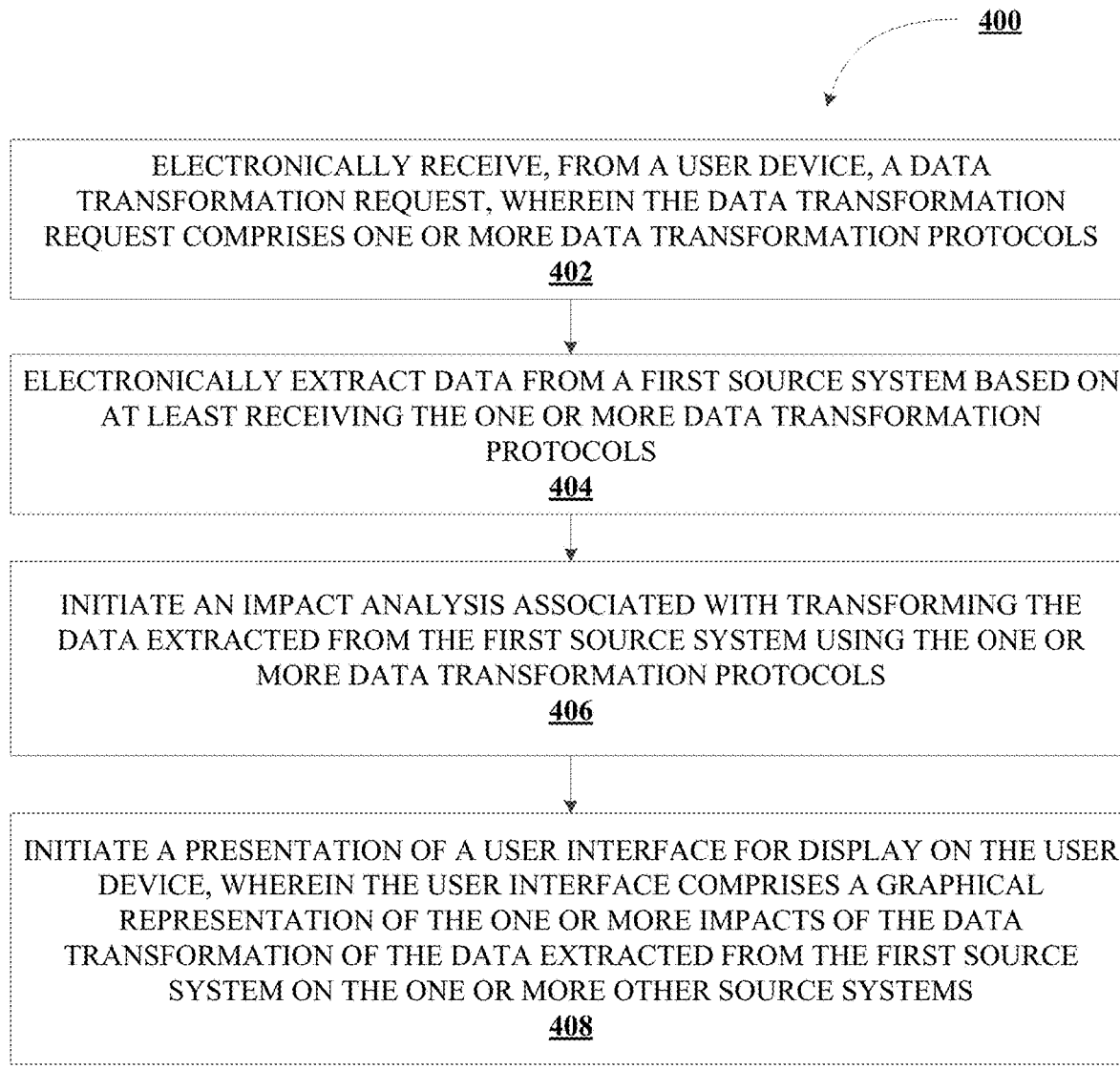
Figure 5:
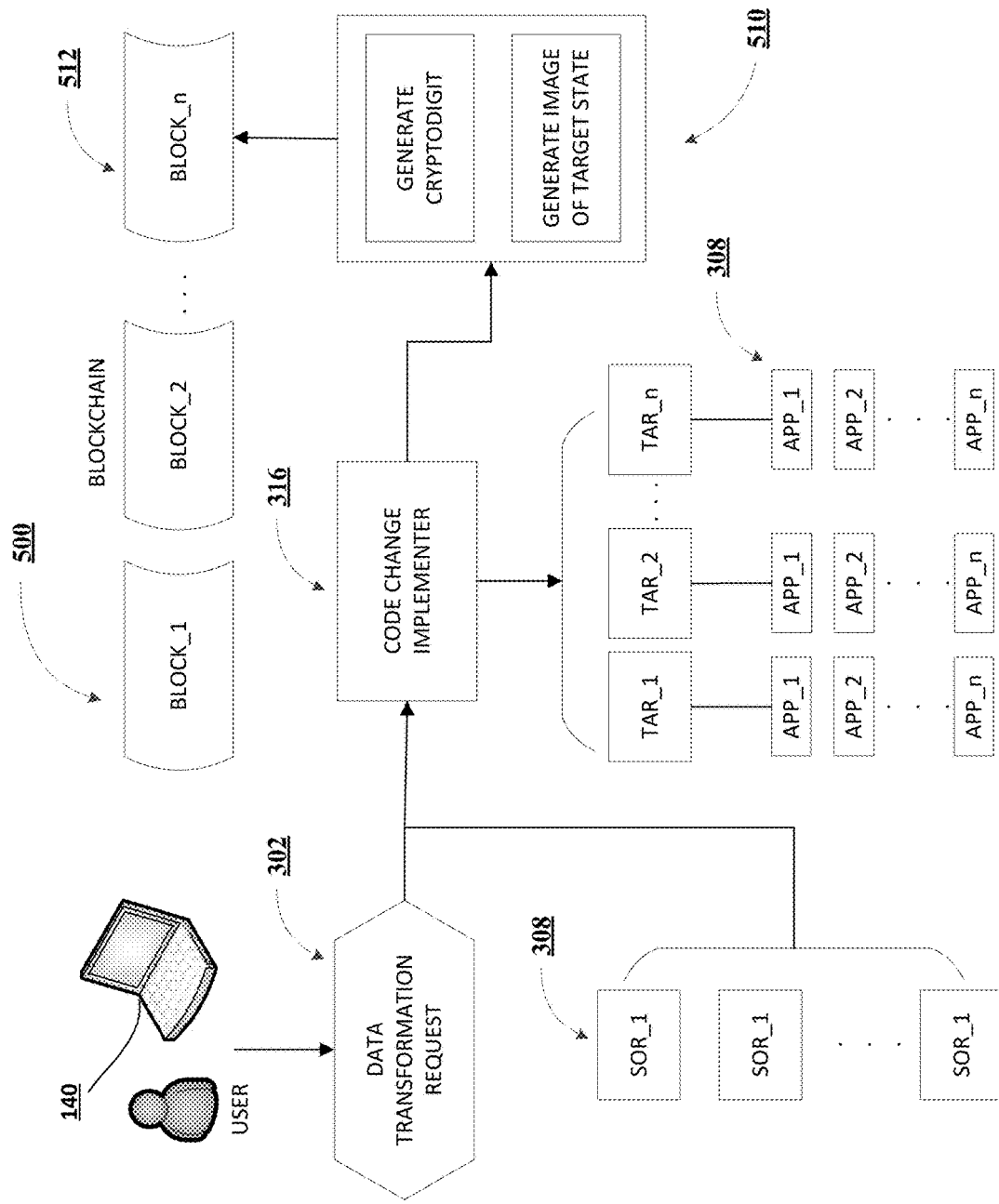
Figure 6:
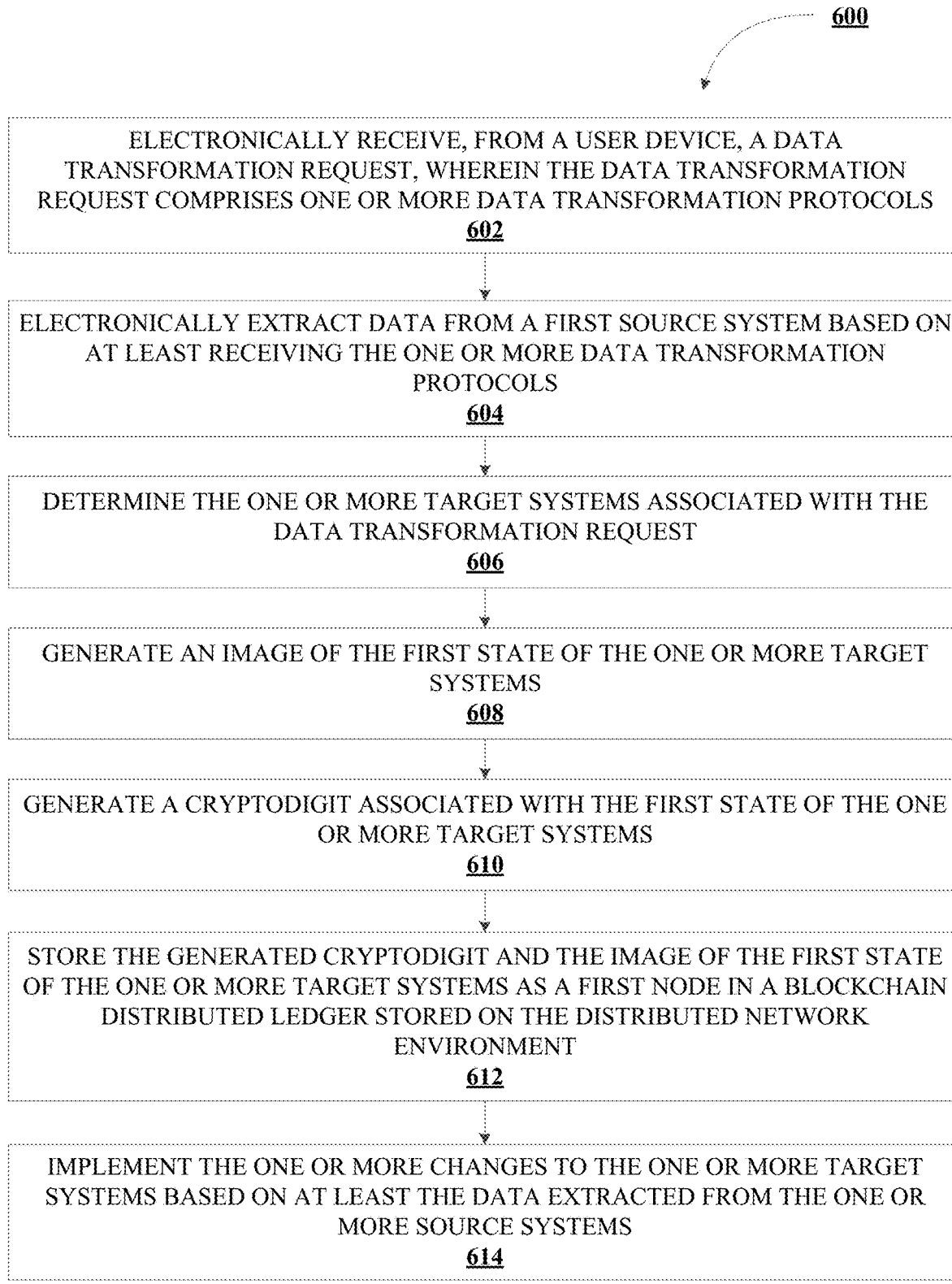
Figure 7:
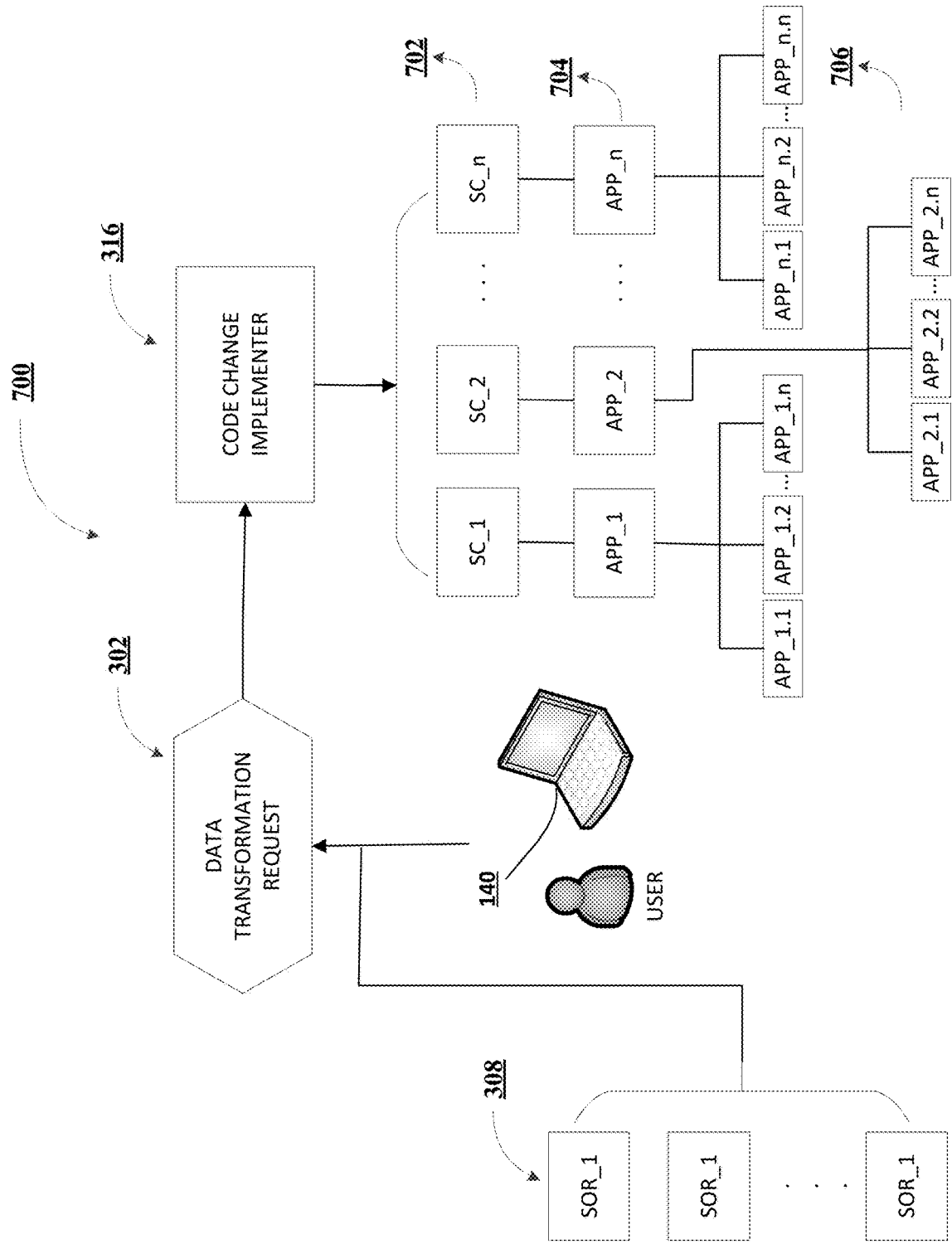
Figure 8:
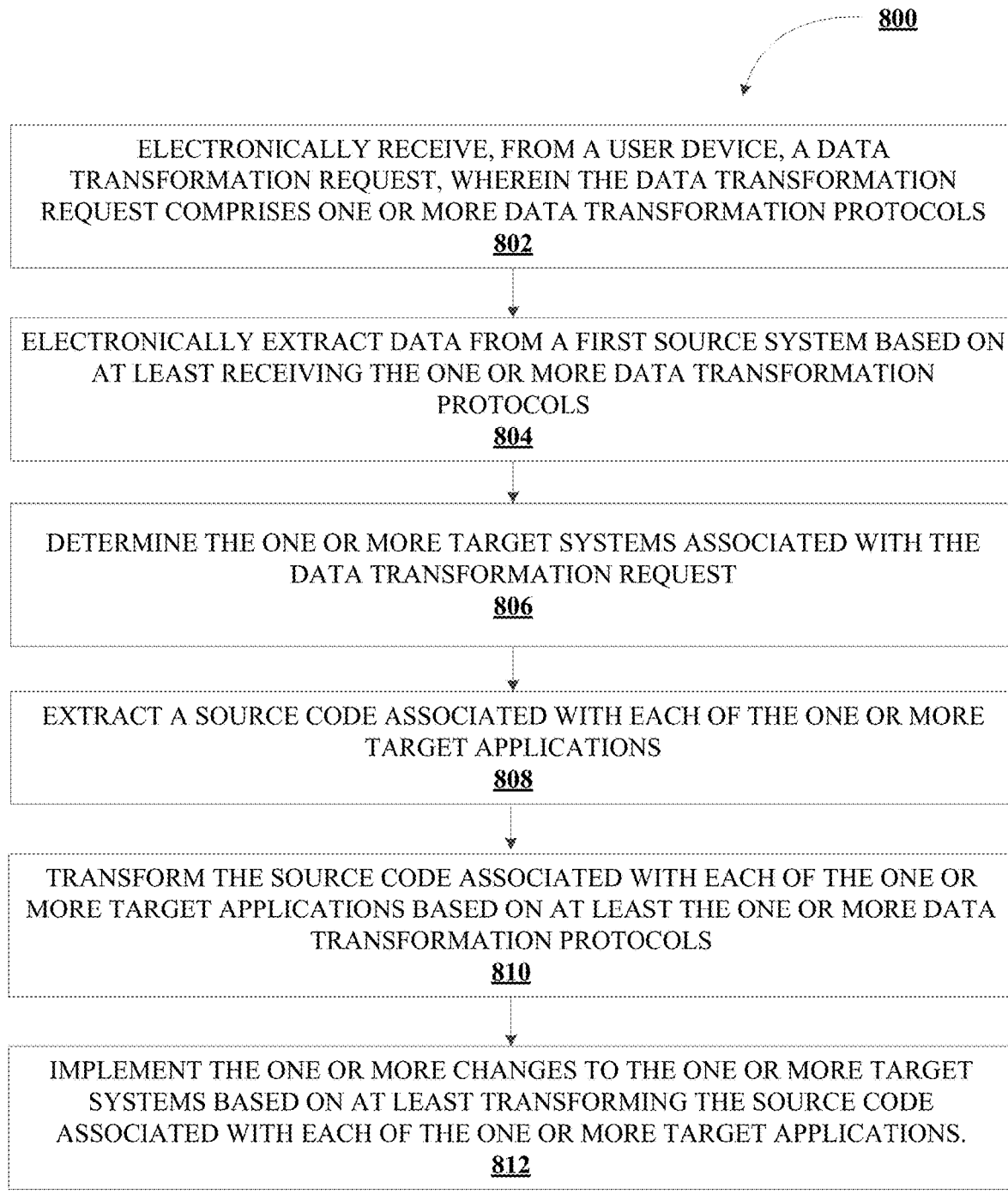

Having thus described embodiments of the invention in general terms, reference will now be made the accompanying drawings, wherein:

FIG. 1 illustrates technical components of a system for data transformation prediction and code change analysis, in accordance with an embodiment of the invention; and FIG. 2 illustrates a distributed ledger broadcasting and linking within a distributed network environment, in accordance with an embodiment of the invention;

FIG. 3 illustrates a system flowchart for data transformation prediction and code change analysis, in accordance with an embodiment of the invention;

FIG. 4 illustrates a high level process flow for data transformation prediction and code change analysis, in accordance with an embodiment of the invention;

FIG. 5 illustrates a system flowchart for restoring transformation state using blockchain technology, in accordance with an embodiment of the invention;

FIG. 6 illustrates a high level process flow for restoring transformation state using blockchain technology, in accordance with an embodiment of the invention;

FIG. 7 illustrates a system flowchart for dynamic intelligent code change implementation, in accordance with an embodiment of the invention; and FIG. 8 illustrates a high level process flow for dynamic intelligent code change implementation, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As used herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

As used herein, a "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, to "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

As used herein, an "interaction" may refer to any communication between one or more users, one or more entities or institutions, and/or one or more devices, nodes, clusters, or systems within the system environment described herein. For example, an interaction may refer to a transfer of data between devices, a accessing of stored data by one or more nodes of a computing cluster, a transmission of a requested task, or the like.

As used herein, a "blockchain" is a form of distributed ledger technology which employs a chain of blocks to secure and validate distributed consensus. A blockchain is distributed across and managed by peer-to-peer networks. Since it is a distributed ledger, it can exist without a centralized authority or server managing it, and its data quality can be maintained by database replication and computational trust. However, the structure of the blockchain makes it distinct from other kinds of distributed ledgers. Data on a blockchain is grouped together and organized in blocks. The blocks are then linked to one another and secured using cryptography. A blockchain provides numerous advantages over traditional databases. A large number of computing devices with access to a blockchain may reach a consensus regarding the validity of a transaction contained on the transaction ledger. Thus, a "valid" transaction is one that can be validated based on a set of rules that are defined by the particular system implementing the blockchain. Its append-only structure only allows data to be added to the database: altering or deleting previously entered data on earlier blocks is impossible. Blockchain technology is therefore well-suited for recording events, managing records, processing transactions, tracing resources, and voting. For purposes of the invention, the term "blockchain" and "distributed ledger" may be used interchangeably.

As used herein, "machine learning algorithms" or "machine learning models" include but are not limited to linear regression, logistic regression, neural networks, support vector machines, decision trees, and their derivatives. In practice, one technique can be used in the research effort to provide insights for another machine learning/modeling technique. Thus, a combination of techniques can be used in the analysis and in the product implementation. Once the machine learning algorithm/modeling structure and method is determined, the algorithm is trained based on a training dataset and the corresponding ground truth class label. The listing of machine learning/modeling structures and techniques listed herein are not exhaustive. Those skilled in the art will appreciate that other predictive modeling structures and techniques may be used in various embodiments. Example predictive modeling structures and techniques may include genetic algorithms, text classifiers, hidden Markov models, self-organizing maps, and dynamic Bayesian analysis.

FIG. 1 presents an exemplary block diagram of the system environment for restoring a transformation state using blockchain technology, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown).

In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a distributed ledger broadcasting and linking within a distributed network environment 200, in accordance with an embodiment of the invention. As described above and referring to FIG. 2, a distributed ledger 275 is maintained across several computing devices 250a, 250b, 250c, and 250d. Each computing device may have a complete or partial copy of the entire ledger. Transactions are initiated at a computing device and communicated to various other computing devices within the network. Any of these computing devices can validate a transaction, add the transaction to its copy of the distributed ledger 275, and/or broadcast the transaction, its validation (in the form of a block) and/or other data to other computing devices. These transactions on the distributed ledger 275 are then grouped together and organized in blocks. These blocks are then linked to one another, time-stamped, and secured using cryptography.

Extract, Transform, and Load (ETL) refers to a process in database usage and in data warehousing that involves: (i) extracting data from multiple source systems, (ii) transforming the data to it operational needs using specific data transformation protocols, and (iii) loading the transformed data on to multiple target systems, such as an operational data store, data mart, or data warehouse. While each data transformation request specifies the source and target systems, the implementation of data transformation protocols may create unexpected dependencies between the source systems, target systems, and one or more other source systems. Typically, known dependencies are part of the metadata associated with the data transformation protocols. An analyst executing the ETL process programs any known dependencies into the data transformation protocols prior to initiating the execution of the data transformation. However, some dependencies are only apparent after the data transformation is executed. Such dependencies may be difficult to spot and may result in inadvertent complexities within the system environment. In such cases, the analyst is expected to identify each unexpected dependency in other source systems and address them individually. With the emerging popularity of big data ETL tools, processing each unexpected dependency individually becomes inefficient and tedious. The present invention provides the practical benefit in its application of using machine learning algorithms to learn dependencies created by historical transformation data and predict unexpected dependencies created by the data transformation request on other source systems and explores the impact of the model on any other system.

FIG. 3 illustrates a system flowchart for data transformation prediction and code change analysis 300, in accordance with an embodiment of the invention. At step 302, the system may be configured to electronically receive, from a user input system (device) 140, a data transformation request. The data transformation request includes instructions to extract data from one or more source systems, transform the data using one or more data transformation protocols, and load the transformed data into one or more target systems. Accordingly, the data transformation request may identify the source systems, the target systems, and one or more data transformation protocols. In some embodiments, the one or more data transformation protocols may include specific rules governing the conversion of data from one format or structure into another format or structure.

Next, at step 304, in response to receiving the data transformation request, the system may be configured to electronically extract data from one or more source systems 308. As shown in FIG. 3, most extractions models are configured to consolidate data from multiple source systems. Each source system may use a unique data organization/format. Common data source formats include, but are not limited to relational databases, flat files, non-relational data structures such as Information Management System (IMS) or other data structures such as Virtual Storage Access Method (VSAM) or Indexed Sequential Access Method (ISAM), or even fetching from outside sources such as through web spidering or screen-scraping. In some embodiments, extracting data from the first source system further includes parsing of the extracted data, resulting in a check if the data meets an expected pattern or structure. If not, the data may be rejected entirely, or in part. In some embodiments, the system may be configured to execute the check in batches. In this regard, the extracted data is checked based on a predetermined batch window which defines the number of fields and/or records to be checked at a particular time instant. In some other embodiments, the system may be configured to execute the check as the data is being extracted from the source systems in real-time.

In response to receiving the data transformation request, the system may be configured to initiate an impact analysis associated with transforming the data extracted from a first source system associated with the one or more source systems 308 based on the one or more data transformation protocols. In some embodiments, initiating the impact analysis further includes determining one or more impacts of the data transformation of the data extracted from the first source system on one or more other source systems. In this regard, at step 304, the system may be configured to initiate one or more machine learning algorithms on information associated with one or more historical data transformations stored in the repository 306. In some embodiments, the information associated with the one or more historical data transformation includes one or more historical transformation requests, one or more historical transformation protocols, one or more source systems associated with the one or more historical data transformation requests, and the impact of the one or more historical transformation of historical data extracted from the one or more source systems associated with the one or more historical data transformation requests is stored in the repository 306.

For purposes of this invention, the machine learning algorithms implemented are supervised. Supervised learning algorithms build a mathematical model of a set of data that contains both the inputs and the desired outputs. The data is known as training data, and consists of a set of training examples. Each training example has one or more inputs and a desired output, also known as a supervisory signal. In some embodiments, the one or more inputs may include one or more dimensions. Here, the one or more dimensions of the one or more inputs include, but are not limited to, a historical data transformation request, one or historical data transformation protocols associated with the historical data transformation request, and one or more source systems associated with the historical data transformation request; the desired output is the impact of the one or more historical transformations of historical data extracted from the one or more source systems associated with the one or more historical data transformation requests. In some embodiments, the impact of the one or more historical transformation requests include dependencies created by each of the one or more historical transformation requests on one or more other source systems.

Once the machine learning algorithm is trained on the one or more inputs and desired output, the trained machine learning model may then be configured to produce an inferred function which can then be used to classify new observations. Accordingly, the system may be configured to receive a new observation and initiate the classification of the new observation using the trained machine learning model. In this regard, the system may be configured to receive the data transformation request, one or data transformation protocols, and the first source system. Next, based on the new observation and the previously trained function, the system may be configured to predict the impact of the data transformation request at the code change prediction and analysis step 310. In some embodiments, the impact may include any dependencies likely to be created by the transformation of data extracted from the first source system using the one or more data transformation protocols. In response to predicting the impact of the transformation of data, the system may be configured to generate an impact report 312. In some embodiments, the impact report includes may list one or more dependencies likely to be created by the transformation of data extracted from the first source system using the one or more data transformation protocols. These dependencies include, but are not limited to, one or more source systems and/or target systems affected by the transformation of data based on the data transformation request. In addition, the impact report 312 further includes a likelihood of impact associated with each source and/or target system.

Having generated the impact report, the system may be configured to initiate a presentation of a user interface for display on the user device, wherein the user interface comprises a graphical representation of the one or more impacts of the data transformation of the data extracted from the first source system on the one or more other source systems. In some embodiments, in addition to the impact report 312, the system may be configured to generate a map of the one or more impacts of the data transformation. By dynamically generating a map of the impact, the system may be configured to visually present which of these source systems and/or target systems are likely to be affected by the data transformation.

In response, the system may be configured to electronically receive, via the user interface, a confirmation from the user to implement at least a portion of the data transformation request at 314. In this regard, the user may select one or more impacts presented on the user interface and confirm which of the impacts are acceptable for the user. In another aspect, the user may select one or more impacts presented on the user interface and confirm which of the impacts are not acceptable for the user. In some embodiments, based on the received user selection, the system may be configured to dynamically alter the one or more data transformation protocols such that the likely impact will not affect the source systems and/or target systems, the impact of which was indicated as being unacceptable by the user.

In response to receiving confirmation from the user to implement the data transformation, the system may be configured to determine one or more target systems 318 associated with the data transformation of the data extracted from the first source system 308. In addition, the system may be configured to determine one or more target applications associated with each of the one or more target systems. In response, the system may be configured to initiate the data transformation of the data extracted from the first source system by initiating one or more changes to the one or more target systems 318 using the one or more target applications based on at least the one or more data transformation protocols. In some embodiments, the one or more changes are implemented using a code change implementer 316.

FIG. 4 illustrates a high level process flow for data transformation prediction and code change analysis 400, in accordance with an embodiment of the invention. As shown in block 402, the process flow includes electronically receiving, from a user device, a data transformation request. Next, as shown in block 404, the process flow includes electronically extracting data from a first source system based on at least receiving the one or more data transformation protocols. Next, as shown in block 406, the process flow includes initiating an impact analysis associated with transforming the data extracted from the first source system using the one or more data transformation protocols. In some embodiments, the impact analysis further includes initiating one or more machine learning algorithms on one or more historical data transformation requests, one or historical data transformation protocols, one or more source systems associated with the one or more historical data transformation requests, and an impact of the one or more historical transformation of historical data extracted from the one or more source systems associated with the one or more historical data transformation requests. In this regard, the system may be configured to receive the one or more data transformation protocols and information associated with the first source system, and predict, using the one or more machine learning algorithms, the one or more impacts of the data transformation of the data extracted from the first source system on the one or more other source systems. In some embodiments, the system may be configured to generate a map of the one or more impacts of the data transformation of the data extracted from the first source system on the one or more other source systems. Next, as shown in block 408, the process flow includes initiating a presentation of a user interface for display on the user device, wherein the user interface comprises a graphical representation of the one or more impacts of the data transformation of the data extracted from the first source system on the one or more other source systems. In some embodiments, the system may be configured to determine one or more target systems associated with the data transformation of the data extracted from the first source system, determine one or more target applications associated with each of the one or more target system, and initiate the data transformation of the data extracted from the first source system, wherein initiating further comprises initiating one or more changes to the one or more target systems using the one or more target applications based on at least the one or more data transformation protocols. In some embodiments, initiating the one or more changes further includes extracting a source code associated with each of the one or more target applications, transforming the source code associated with each of the one or more target applications, and implementing the one or more changes to the one or more target systems based on at least transforming the source code associated with each of the one or more target applications. In some embodiments, the system may be configured to initiate, via the user interface, a notification to the user indicating the one or more impacts of the data transformation of the data extracted from the first source system on the one or more other source systems, wherein the notification further comprises a confirmation request to implement the data transformation of the data extracted from the first source system, electronically receive, via the user interface, a confirmation from the user to implement the data transformation of the data extracted from the first source system, and initiate the data transformation of the data extracted from the first source system based on at least receiving the confirmation from the user to implement the data transformation of the data extracted from the first source system.

FIG. 5 illustrates a system flowchart for restoring transformation state using blockchain technology 500, in accordance with an embodiment of the invention. As shown in FIG. 5, the system may be configured to receive the data transformation step as described herein at step 302. In response to receiving the data transformation request, the system may be configured to extract data from one or more source systems 308, transform the data extracted from the one or more source systems 308 based on one or more data transformation protocols associated with the data transformation request, and implement the transformation of data using the code change implementer on the one or more target systems 318, at 316.

In some embodiments, the target systems 318 include one or more target applications that store data in variables in specific sections of the memory associated with each target system. The size of the content and the location of the content in the memory at any given point when accessed by each target application is defined as the state of the target system. Therefore, the implementation of a change on one or more target systems may affect a change in the state of the target system. In response to implementing a change on the one or more target systems, the system may be configured to generate an image of the state of the one or more target systems and a cryptodigit uniquely identifying the state of the one or more target systems post-change at the step of 510.

In response to generating the cryptodigit and the image of the state of the one or more target systems, the system may be configured to store the cryptodigit and the image in a blockchain distributed ledger 512 as a block. In this way, with each change implemented on the one or more target systems, the system may be configured to store the associated cryptodigit and the image of the target systems as a block on the blockchain distributed ledger. The blockchain system typically has two primary types of records. The first type is the transaction type, which consists of the actual data stored in the block chain. The second type is the block type, which are records that confirm when and in what sequence certain transactions became recorded as part of the block chain. Transactions are created by participants using the blockchain that implement changes to the target systems. Users of the block chain create transactions that are passed around to various nodes of the blockchain. Blocks, on the other hand, are created by validators who validate a transaction and create blocks. A "valid" transaction is one that can be validated based on a set of rules that are defined by the particular system implementing the blockchain. For example, in the case of cryptocurrencies, a valid transaction is one that is digitally signed, spent from a valid digital wallet and, in some cases that meets other criteria. Any of the nodes can validate a transaction, add the transaction to its copy of the block chain, and/or broadcast the transaction, its validation (in the form of a block) and/or other data to other nodes. In some embodiments, a generated cryptodigit and image of the target state that is placed on the blockchain may be validated by one or more predetermined number of nodes of the blockchain in order for the transaction to proceed. The blockchain may be configured with a set of rules to dictate the validation of each transaction. Accordingly, the nodes work as validators to validate the transaction based on the set of rules. In some embodiments, the set of rules may include, but are not limited to, authenticating the user associated with the transaction, determining whether the data transformation protocols lie within the parameters of the authorization associated with the user based on the user's authentication level, determining whether the impact of the transformation of data was authorized by the user, and/or determining whether any unintended impact of the data transformation is within a predetermined exposure level such that its overall effect is tolerable. Once validated, the nodes may then create the block, and place the block in the blockchain by linking the block with the blockchain. Accordingly, the blockchain may be used to maintain an image of each data transformation and the associated cryptodigit on each block based on an implemented change. The security of which is enhanced by the distributed nature of the block chain. A block chain typically includes several nodes, which may be one or more systems, machines, computers, databases, data stores or the like operably connected with one another. The present invention provides an application for validation service for each node. In this way, the nodes may be able to transmit and receive information associated with each change and the information associated with the change.

FIG. 6 illustrates a high level process flow for restoring transformation state using blockchain technology, in accordance with an embodiment of the invention. As shown in block 602, the process flow includes electronically receiving, from a user device connected to a distributed network environment, a data transformation request to implement one or more changes to one or more target systems, wherein the data transformation request comprises one or more data transformation protocols. Next, as shown in block 604, the process flow includes electronically extracting data from one or more source systems based on at least receiving the one or more data transformation protocols. Next, as shown in block 606, the process flow includes determining the one or more target systems associated with the data transformation request, wherein the one or more target systems are associated with a first state. Next, as shown in block 608, the process flow includes generating an image of the first state of the one or more target systems. Next, as shown in block 610, the process flow includes generating a cryptodigit associated with the first state of the one or more target systems. Next, as shown in block 612, the process flow includes storing the generated cryptodigit and the image of the first state of the one or more target systems as a first node in a blockchain distributed ledger stored on the distributed network environment. Next, as shown in block 614, the process flow includes implementing the one or more changes to the one or more target systems based on at least the data extracted from the one or more source systems, wherein implementing further comprises changing a state of the one or more target systems from the first state to a second state.

In some embodiments, the system may be configured electronically receive from the user device, a state reversion request to reverse a state of the one or more target systems from the second state to the first state. In one aspect, the state reversion request includes a first cryptodigit. In response to receiving the state reversion request, the system may be configured to determine that the first cryptodigit matches the cryptodigit associated with the first node in the blockchain distributed ledger. In response to determining the match, the system may be configured to extract the image of the first state from the first node. Next, the system may be configured to dynamically generate one or more data transformation protocols based on the first state. In response to generating the data transformation protocols, the system may be configured to implement an impact analysis to determine one or more impacts of the state reversion request on the one or more target systems and one or more other source systems based on at least the extracted image of the first state and the corresponding data transformation protocols. In response, the system may be configured to initiate a presentation of a user interface for display on the user device, the user interface comprising a graphical representation of the one or more impacts of the state reversion request. In some embodiments, the system may be configured to dynamically generate a map of the one or more impacts of the state reversion request.

In some embodiments, the system may be configured to determine one or more target applications associated with the state reversion request. In response, the system may be configured to initiate the state reversion of the one or more target systems from the second state to the first state. In one aspect, initiating the state reversion further includes reversing the one or more changes to the one or more target systems. In some embodiments, reversing the one or more changes to the one or more target systems includes restoring the state of the one or more target applications back to the first state.

In some embodiments, the system may be configured to initiate the changes to the target systems by extracting a source code associated with each of the one or more target applications associated with the one or more target systems. In response to extracting the source code, the system may be configured to transform the source code associated with each of the one or more target applications based on at least the one or more generated data transformation protocols. In response to transforming the source code, the system may be configured to implement the one or more changes to the one or more target systems.

In some embodiments, the system may be configured to initiate, via the user interface, a notification to the user indicating the one or more impacts of the state reversion request on the one or more other source systems, wherein the notification further comprises a confirmation request to implement the state reversion request. Similar to the data transformation request, the system may be configured to electronically receive, via the user interface, a confirmation from the user to implement the state reversion request. In response, the system may be configured to initiate the state reversion of the one or more target systems from the second state to the first state based on at least receiving the confirmation from the user to implement the state reversion request.

Once the changes have been implemented, the system may then be configured to generate an image of the second state of the one or more target systems. In addition, the system may be configured to generate a cryptodigit associated with the image of the second state of the one or more target systems. In response, the system may be configured to place the generated cryptodigit and the image of the second state as a block on the blockchain. In this way, each data transformation request and state reversion request is stored on the blockchain.

As described herein, each source system may include multiple applications, typically developed and supported by different vendors or hosted on separate computer hardware. Each application is associated with a unique format. Similarly, each target system may include multiple applications supported and hosted by different vendors, each associated with a unique format. Thus data extraction, transformation, and loading requires a developer to manually generate the configuration files needed to control transformation for each application in both the source systems and the target systems. The present invention provides the practical benefit in its application of implementing dynamic code change capabilities across multiple ETL applications with a single sign-on. This avoids unintentional exposing of confidential information and business related derivations and calculations to users or groups that do not have the authority to access the information.

FIG. 7 illustrates a system flowchart for dynamic intelligent code change implementation 700, in accordance with an embodiment of the invention. As shown in FIG. 7, the flowchart includes receiving from a user device 140, a data transformation request at step 302 to transform the data extracted from the source system 308 using one or more data transformation protocols. In response to receiving the data transformation request, the system may be configured to implement, using the code change implementer 316, the transformation of data based on the data transformation protocols. In this regard, the system may be configured to extract a source code at step 702 from each of the one or more target applications 704. In this way, the present invention provides the practical benefit in its application of implementing the one or more changes irrespective of a source code type simultaneously, thereby reducing the likelihood of errors, and securing the underlying code derivations. Accordingly, the system may be configured to determine a source code type associated with one or more target applications stored on the target systems, and extract the corresponding source code for code change implementation. The source code type includes, but is not limited to, machine code, XML code, and human readable code, and/or the like. In response to extracting the source code, the system may be configured to execute the code changes to the extracted source code. Once the changes have been executed, the system may then be configured to implement the changes executed on the source code to each application associated with the source code type 706, thereby implementing the changes to each target application.

FIG. 8 illustrates a high level process flow for dynamic intelligent code change implementation 800, in accordance with an embodiment of the invention. As shown in block 802, the process flow includes electronically receiving, from a user device, a data transformation request, wherein the data transformation request comprises one or more data transformation protocols. Next, as shown in block 804, the process flow includes electronically extracting data from a first source system based on at least receiving the one or more data transformation protocols. Next, as shown in block 806, the process flow includes determining the one or more target systems associated with the data transformation request. In some embodiments, determining the one or more target systems includes determining one or more target applications. Next, as shown in block 808, the process flow includes extracting a source code associated with each of the one or more target applications. Next, as shown in block 810, the process flow includes transforming the source code associated with each of the one or more target applications based on at least the one or more data transformation protocols.

In some embodiments, the system may be configured to transform the source code associated with each of the one or more target applications concurrently. In this regard, the system may be configured to store the source code associated with each of the one or more target applications in a temporary storage location. In one aspect, the system may be configured to extract at least a portion of the source code from each of the one or more target applications which require code changes based on the data transformation protocols. In this way, the present invention provides the practical benefit in its application of storing the absolute minimum amount of source code required to execute the code changes, thereby achieving faster data retrieval and efficient usage of memory.

Next, as shown in block 812, the process flow includes implementing the one or more changes to the one or more target systems based on at least transforming the source code associated with each of the one or more target applications. In some embodiments, the system may be configured to transform each portion of the source code associated with the one or more target applications concurrently by implementing the code changes.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A computer implemented method for data transformation prediction and code change analysis, the method comprising:

electronically receiving, from a user device, a data transformation request, wherein the data transformation request comprises one or more data transformation protocols;

electronically extracting data from a first source system based on at least receiving the one or more data transformation request;

initiating an impact analysis associated with the data transformation request, wherein initiating further comprises determining one or more impacts of the data transformation of the data extracted from the first source system on one or more other source systems;

predicting, using one or more machine learning algorithms, the one or more impacts of the data transformation of the data extracted from the first source system on the one or more other source systems;

initiating a presentation of a user interface for display on the user device, wherein the user interface comprises a graphical representation of the one or more impacts of the data transformation of the data extracted from the first source system on the one or more other source systems;

initiating the data transformation of the data extracted from the first source system, wherein initiating the data transformation further comprises implementing one or more changes to one or more target systems using one or more target applications based on at least the one or more data transformation protocols, wherein implementing the one or more changes further comprises:

determining one or more target systems, wherein the one or more target systems comprises one or more target applications;

extracting a source code associated with each of the one or more target applications;

transforming the source code associated with each of the one or more target applications based on at least the one or more data transformation protocols;

implementing the one or more changes to the one or more target systems based on at least transforming the source code associated with the one or more target applications.

2. The method of claim 1, wherein the impact analysis further comprises initiating one or more machine learning algorithms on one or more historical data transformation requests, one or historical data transformation protocols, one or more source systems associated with the one or more historical data transformation requests, and an impact of the one or more historical transformation of historical data extracted from the one or more source systems associated with the one or more historical data transformation requests.

3. The method of claim 2, wherein the method further comprises:

receiving the one or more data transformation protocols and information associated with the first source system.

4. The method of claim 3, wherein the method further comprises generating a map of the one or more impacts of the data transformation of the data extracted from the first source system on the one or more other source systems.

5. The method of claim 3, wherein the method further comprises:

initiating, via the user interface, a notification to the user indicating the one or more impacts of the data transformation of the data extracted from the first source system on the one or more other source systems, wherein the notification further comprises a confirmation request to implement the data transformation of the data extracted from the first source system;

electronically receiving, via the user interface, a confirmation from the user to implement the data transformation of the data extracted from the first source system; and initiating the data transformation of the data extracted from the first source system based on at least receiving the confirmation from the user to implement the data transformation of the data extracted from the first source system.

6. The method of claim 3, wherein the method further comprises:

determining the one or more target systems associated with the data transformation request, wherein the one or more target systems are associated with a first state;

generating an image of the first state of the one or more target systems;

generating a cryptodigit associated with the first state of the one or more target systems; and storing the generated cryptodigit and the image of the first state of the one or more target systems as a first node in a blockchain distributed ledger stored on a distributed network environment.

7. The method of claim 6, wherein the method further comprises:

electronically receiving from the user device, a state reversion request to reverse a state of the one or more target systems from a second state to the first state, wherein the state reversion request comprises a first cryptodigit;

determining that the first cryptodigit matches the cryptodigit associated with the first node in the blockchain distributed ledger;

extracting the image of the first state from the first node;

determining one or more impacts of the state reversion request on the one or more target systems and one or more other source systems based on at least the extracted image of the first state; and initiating a presentation of a user interface for display on the user device, wherein the user interface comprises a graphical representation of the one or more impacts of the state reversion request.

8. A system for data transformation prediction and code change analysis, the system comprising:

at least one non-transitory storage device; and at least one processing device coupled to the at least one non-transitory storage device, wherein the at least one processing device is configured to:

electronically receive, from a user device, a data transformation request, wherein the data transformation request comprises one or more data transformation protocols;

electronically extract data from a first source system based on at least receiving the one or more data transformation request;
initiate an impact analysis associated with the data transformation request, wherein initiating further comprises determining one or more impacts of the data transformation of the data extracted from the first source system on one or more other source systems;
predict, using one or more machine learning algorithms, the one or more impacts of the data transformation of the data extracted from the first source system on the one or more other source systems;
initiate a presentation of a user interface for display on the user device, wherein the user interface comprises a graphical representation of the one or more impacts of the data transformation of the data extracted from the first source system on the one or more other source systems;
initiate the data transformation of the data extracted from the first source system, wherein initiating the data transformation further comprises implementing one or more changes to one or more target systems using one or more target applications based on at least the one or more data transformation protocols, wherein implementing the one or more changes further comprises:
 determining one or more target systems, wherein the one or more target systems comprises one or more target applications;
 extracting a source code associated with each of the one or more target applications;
 transforming the source code associated with each of the one or more target applications based on at least the one or more data transformation protocols;
 implementing the one or more changes to the one or more target systems based on at least transforming the source code associated with the one or more target applications.

9. The system of claim 8, wherein the impact analysis further comprises initiating one or more machine learning algorithms on one or more historical data transformation requests, one or historical data transformation protocols, one or more source systems associated with the one or more historical data transformation requests, and an impact of the one or more historical transformation of historical data extracted from the one or more source systems associated with the one or more historical data transformation requests.

10. The system of claim 9, wherein the at least one processing device is further configured to:
receive the one or more data transformation protocols and information associated with the first source system.

11. The system of claim 10, wherein the at least one processing device is further configured to generate a map of the one or more impacts of the data transformation of the data extracted from the first source system on the one or more other source systems.

12. The system of claim 8, wherein the at least one processing device is further configured to:
initiate, via the user interface, a notification to the user indicating the one or more impacts of the data transformation of the data extracted from the first source system on the one or more other source systems, wherein the notification further comprises a confirmation request to implement the data transformation of the data extracted from the first source system;
electronically receive, via the user interface, a confirmation from the user to implement the data transformation of the data extracted from the first source system; and
initiate the data transformation of the data extracted from the first source system based on at least receiving the confirmation from the user to implement the data transformation of the data extracted from the first source system.

13. The system of claim 8, wherein the at least one processing device is further configured to:
determine the one or more target systems associated with the data transformation request, wherein the one or more target systems are associated with a first state;
generate an image of the first state of the one or more target systems;
generate a cryptodigit associated with the first state of the one or more target systems; and
store the generated cryptodigit and the image of the first state of the one or more target systems as a first node in a blockchain distributed ledger stored on a distributed network environment.

14. The system of claim 13, wherein the at least one processing device is configured to:
electronically receive from the user device, a state reversion request to reverse a state of the one or more target systems from a second state to the first state, wherein the state reversion request comprises a first cryptodigit;
determine that the first cryptodigit matches the cryptodigit associated with the first node in the blockchain distributed ledger;
extract the image of the first state from the first node;
determine one or more impacts of the state reversion request on the one or more target systems and one or more other source systems based on at least the extracted image of the first state; and
initiate a presentation of a user interface for display on the user device, wherein the user interface comprises a graphical representation of the one or more impacts of the state reversion request.

15. A computer program product for data transformation prediction and code change analysis, the computer program product comprising a non-transitory computer-readable medium comprising code causing an apparatus to:
electronically receive, from a user device, a data transformation request, wherein the data transformation request comprises one or more data transformation protocols;
electronically extract data from a first source system based on at least receiving the one or more data transformation request;
initiate an impact analysis associated with the data transformation request, wherein initiating further comprises determining one or more impacts of the data transformation of the data extracted from the first source system on one or more other source systems;
predict, using one or more machine learning algorithms, the one or more impacts of the data transformation of the data extracted from the first source system on the one or more other source systems;
initiate a presentation of a user interface for display on the user device, wherein the user interface comprises a graphical representation of the one or more impacts of the data transformation of the data extracted from the first source system on the one or more other source systems;
initiate the data transformation of the data extracted from the first source system, wherein initiating the data transformation further comprises implementing one or more changes to one or more target systems using one or more target applications based on at least the one or more data transformation protocols, wherein implementing the one or more changes further comprises:

determining one or more target systems, wherein the one or more target systems comprises one or more target applications;

extracting a source code associated with each of the one or more target applications;

transforming the source code associated with each of the one or more target applications based on at least the one or more data transformation protocols;

implementing the one or more changes to the one or more target systems based on at least transforming the source code associated with the one or more target applications.

16. The computer program product of claim 15, wherein the impact analysis further comprises initiating one or more machine learning algorithms on one or more historical data transformation requests, one or historical data transformation protocols, one or more source systems associated with the one or more historical data transformation requests, and an impact of the one or more historical transformation of historical data extracted from the one or more source systems associated with the one or more historical data transformation requests.

17. The computer program product of claim 16, wherein the apparatus is further configured to:

receive the one or more data transformation protocols and information associated with the first source system.

18. The computer program product of claim 17, wherein the apparatus is further configured to generate a map of the one or more impacts of the data transformation of the data extracted from the first source system on the one or more other source systems.

19. The computer program product of claim 15, wherein the apparatus is further configured to:

determine the one or more target systems associated with the data transformation request, wherein the one or more target systems are associated with a first state;

generate an image of the first state of the one or more target systems;

generate a cryptodigit associated with the first state of the one or more target systems; and store the generated cryptodigit and the image of the first state of the one or more target systems as a first node in a blockchain distributed ledger stored on a distributed network environment.

20. The computer program product of claim 19, wherein the apparatus is further configured to:

electronically receive from the user device, a state reversion request to reverse a state of the one or more target systems from a second state to the first state, wherein the state reversion request comprises a first cryptodigit;

determine that the first cryptodigit matches the cryptodigit associated with the first node in the blockchain distributed ledger;

extract the image of the first state from the first node;

determine one or more impacts of the state reversion request on the one or more target systems and one or more other source systems based on at least the extracted image of the first state; and initiate a presentation of a user interface for display on the user device, wherein the user interface comprises a graphical representation of the one or more impacts of the state reversion request.

* * * * *